United States Patent
Hong et al.

(10) Patent No.: US 12,516,303 B2
(45) Date of Patent: Jan. 6, 2026

(54) ESTERASE MUTANT AND USE THEREOF

(71) Applicant: ASYMCHEM LIFE SCIENCE (TIANJIN) CO., LTD., Tianjin (CN)

(72) Inventors: Hao Hong, Morrisville, NC (US); James Gage, Morrisville, NC (US); Yi Xiao, Tianjin (CN); Na Zhang, Tianjin (CN); Xuecheng Jiao, Tianjin (CN); Yiming Yang, Tianjin (CN); Xiang Wang, Tianjin (CN); Junqi Zhao, Tianjin (CN)

(73) Assignee: ASYMCHEM LIFE SCIENCE (TIANJIN) CO., LTD., Tianjin (CN)

( * ) Notice: Subject to any disclaimer, the term of this patent is extended or adjusted under 35 U.S.C. 154(b) by 390 days.

(21) Appl. No.: 18/262,480

(22) PCT Filed: Mar. 2, 2021

(86) PCT No.: PCT/CN2021/078738
§ 371 (c)(1),
(2) Date: Jul. 21, 2023

(87) PCT Pub. No.: WO2022/160408
PCT Pub. Date: Aug. 4, 2022

(65) Prior Publication Data
US 2024/0093167 A1    Mar. 21, 2024

(30) Foreign Application Priority Data
Jan. 27, 2021    (CN) .......................... 202110107053.3

(51) Int. Cl.
| | | |
|---|---|---|
| *C12N 9/18* | (2006.01) | |
| *C12N 15/70* | (2006.01) | |
| *C12N 15/81* | (2006.01) | |
| *C12P 7/40* | (2006.01) | |

(52) U.S. Cl.
CPC .............. *C12N 9/18* (2013.01); *C12N 15/70* (2013.01); *C12N 15/81* (2013.01); *C12P 7/40* (2013.01)

(58) Field of Classification Search
CPC .......... C12N 9/18; C12N 15/70; C12N 15/81; C12P 7/40; C12P 41/005; C12Y 301/01
See application file for complete search history.

(56) References Cited

U.S. PATENT DOCUMENTS

2009/0325160 A1    12/2009   Cheung

FOREIGN PATENT DOCUMENTS

| CN | 101490226 | 7/2009 |
|---|---|---|
| CN | 102796714 | 11/2012 |
| CN | 106754818 | 5/2017 |
| CN | 110184254 | 8/2019 |
| CN | 112430585 | 3/2021 |

OTHER PUBLICATIONS

Chen, Qi, et al. "Rational design of a carboxylic esterase RhEst1 based on computational analysis of substrate binding." Journal of Molecular Graphics and Modelling 62 (2015): 319-324.
Database UniProt [Online] Aug. 16, 2004 (Aug. 16, 2004), "EstBI esterase from *Bacillus* sp.", XP002811751, retrieved from EBI accession No. UNIPROT:Q6DV85 Database accession No. Q6DV85.
Extended European Search Report issued in App. No. EP21922007, dated Jul. 1, 2024, 4 pages.
Karpushova A et al: "Cloning, recombinant expression and biochemical characterisation of novel esterases from *Bacillus* sp. associated with the marine sponge *Aplysina aerophoba*", Applied Microbiology and Biotechnology, Springer, Berlin, DE, vol. 67, No. 1, Apr. 1, 2005 (Apr. 1, 2005), pp. 59-69, XP019331781, ISSN: 1432-0614, DOI: 10.1007/S00253-004-1780-6.
Qi, Yi-Ke, et al. "Protein termini relocation plus random mutation: A new strategy for finding key sites in esterase evolution." Molecular Catalysis 460 (2018): 94-99.
Jin-Li B, et al., "Study of site-directed mutagenesis and enzymatic properties of *Escherichia coli* L-glutamate decarboxylase," Science and Technology of Food Industry, vol. 19 (2014), pp. 162-167.
Mengmeng K, "Gene Cloning, Characterization and Mutagenesis of a Cold-Adapted Esterases", China Master's Theses Database (Basic Sciences)—Huazhong Agricultural University, 2017.

*Primary Examiner* — Manjunath N Rao
*Assistant Examiner* — Olga B Soto
(74) *Attorney, Agent, or Firm* — Riverside Law LLP

(57) ABSTRACT

Provided are an esterase mutant and use thereof. The amino acid sequence of the esterase mutant has a sequence as shown in SEQ ID NO: 1, and sites at which amino acid mutations occur include an N51G site.

12 Claims, No Drawings

Specification includes a Sequence Listing.

SEQUENCE LISTING

```
<160> NUMBER OF SEQ ID NOS: 2

<210> SEQ ID NO 1
<211> LENGTH: 314
<212> TYPE: PRT
<213> ORGANISM: Bacillus sp. 01-855

<400> SEQUENCE: 1

Met Gly Ser Asn Asn Asp Asn Met Gly Lys Arg Gly Gly Asn Leu Met
1               5                   10                  15

Ile Thr Ile Pro Thr Val His Lys Val Ser Leu Pro Asn Gly Glu Val
            20                  25                  30

Met Gly Tyr Arg Lys Arg Asp Gly Gly Glu Lys Thr Ile Leu Leu Val
        35                  40                  45

His Gly Asn Met Thr Ser Ser Lys His Trp Asp Leu Phe Phe Glu Thr
    50                  55                  60

Phe Pro Ala Ser Tyr Thr Leu Val Ala Ile Asp Met Arg Gly Phe Gly
65                  70                  75                  80

Glu Ser Ser Tyr Asn Lys Arg Val Glu Gly Ile Glu Asp Phe Ala Gln
                85                  90                  95

Asp Leu Lys Phe Phe Val Asp Gln Leu Gly Leu Asn Asp Phe Thr Met
            100                 105                 110

Ile Gly Trp Ser Thr Gly Gly Ala Val Cys Met Gln Phe Glu Ala Gln
        115                 120                 125
```

Tyr Pro Gly Tyr Cys Asp Lys Ile Val Leu Ile Ser Ser Ala Ser Thr
        130                 135                 140

Arg Gly Tyr Pro Phe Phe Gly Thr His Ser Asp Gly Thr Pro Asp Leu
145                 150                 155                 160

Asn Gln Arg Leu Lys Thr Val Asp Asp Ile Glu Lys Asp Pro Met Arg
                165                 170                 175

Thr Ile Pro Ile Gln Gln Ala Tyr Asp Thr Gly Asn Arg Ala Leu Leu
            180                 185                 190

Lys Thr Ile Trp Asn Ser Leu Ile Tyr Thr His Asn Gln Pro Glu Glu
        195                 200                 205

Lys Arg Tyr Glu Ala Tyr Val Asp Asp Met Met Thr Gln Arg Asn Leu
210                 215                 220

Ala Asp Val Tyr His Ala Leu Asn Thr Phe Asn Ile Ser Ser Val Thr
225                 230                 235                 240

Asn Gly Leu Thr Glu Gly Thr Asn Gln Ala Asn Leu Ile Arg Ile Pro
                245                 250                 255

Val Leu Val Leu Arg Gly Glu Arg Asp Leu Val Ile Ser Lys Glu Met
            260                 265                 270

Thr Glu Glu Ile Val Glu Asp Leu Gly Thr Asn Ser Thr Tyr Lys Glu
        275                 280                 285

Leu Ser Ala Ser Gly His Ser Pro Phe Ile Asp Asp Cys Asp Gln Leu
290                 295                 300

Thr Asn Ile Ile Thr Asp Phe Leu Glu Lys
305                 310

<210> SEQ ID NO 2
<211> LENGTH: 945
<212> TYPE: DNA
<213> ORGANISM: Bacillus sp. 01-855

<400> SEQUENCE: 2

```
atgggcagca ataacgacaa catgggtaaa cgtggcggca acctgatgat caccatcccg      60
acagtgcata aagtgagcct gccgaatggc gaagtgatgg gttatcgtaa gcgcgacggc     120
ggtgaaaaaa ccatcctgct ggtgcacggc aacatgacca gcagcaaaca ttgggacctg     180
ttcttcgaga cctttccggc aagctataca ctggtggcca tcgatatgcg cggcttcggc     240
gaaagcagct ataacaaacg cgtggaaggc atcgaggact tgcccagga cctgaaattc     300 ttcgtggatc agctgggcct gaacgatttc accatgatcg gttggagcac aggcggcgcc     360
gtgtgtatgc agtttgaagc ccagtatccg ggctactgcg acaagattgt gctgattagc     420
agcgcaagca cccgtggcta ccgtttttt ggtacccaca gcgatggcac cccggatctg     480
aatcagcgcc tgaagaccgt ggacgacatc gaaaagatc ctatgcgcac cattccgatc     540
cagcaggcct acgataccgg taaccgcgcc ctgctgaaaa ccatctggaa tagcctgatt     600
tacacccaca accagccgga ggaaaagcgc tatgaggcct atgtggacga catgatgacc     660
cagcgtaatc tggccgatgt gtatcacgcc ctgaacacat tcaacattag cagcgtgacc     720
aacggcctga ccgagggcac caatcaggcc aacctgatcc gcatccctgt gctggttctg     780
cgcggcgaac gcgacctggt gatcagcaaa gagatgaccg aggagatcgt ggaggatctg     840
ggcaccaaca gcacctataa agagctgagc gccagcggcc acagccctt tatcgatgat     900 tgcgaccagc tgaccaacat catcaccgat tttctggaga aataa                    945
```

ESTERASE MUTANT AND USE THEREOF

CROSS-REFERENCES TO RELATED APPLICATION

The present application is a National Stage of International Patent Application No: PCT/CN2021/078738 filed on Mar. 2, 2021, which claims the benefit of the priority of the Chinese patent application with the application No. 202110107053.3, filed to the China National Intellectual Property Administration on Jan. 27, 2021, the entire content of each of which is incorporated in this application by reference.

SEQUENCE LISTING

The present application contains a Sequence Listing which has been submitted electronically as a text file in ASCII format and is hereby incorporated by reference in its entirety. Said Sequence Listing is named "206418-0023-00US_SequenceListing.bd" and is 4,326 bytes in size, created on Mar. 2, 2021, and is identical to that of the international application No. PCT/CN2021/078738 filed on Mar. 2, 2021.

TECHNICAL FIELD

The present disclosure relates to the field of biotechnologies, in particular to an esterase mutant and use thereof.

BACKGROUND

With the development of medicine, pesticide and other fine chemical industries, organic synthesis faces more and more challenges. Firstly, due to the chiral recognition ability in organisms, there is often only one stereoisomer in a drug molecule that has a therapeutic effect, while the other stereoisomers do not have the therapeutic effect or even side effects. Secondly, products with small production batches and high added value, such as pharmaceutical products, have structural complexity and diversity. If the production process has chemical and regional selectivity, unnecessary protection and deprotection steps may be avoided (in traditional organic synthesis, the protection and deprotection steps are usually introduced to compensate for the lack of chemical and regional selectivity of a reaction), the production process is greatly optimized, and thus the production cost is reduced. Therefore, a new-type organic synthesis technology must have the following characteristics: high chemical selectivity, regional selectivity and stereoselectivity; mild reaction conditions; and less pollution to the environment caused by reaction medium post-treatment and the like. A biocatalytic technology has exactly these characteristics, the biocatalytic reaction conditions are mild, and it is usually performed at neutral and room temperatures, or close to such conditions; in most cases, the biocatalytic reaction is performed in an aqueous phase, so the environmental pollution is less; and the biocatalytic reaction usually has the characteristics of high chemical selectivity, regional selectivity and stereoselectivity and the like. Therefore, the application of the biocatalytic technology in organic synthesis has the great scientific significance and practical application value.

Esterase refers to the general name of a class of enzymes with the ability to hydrolyze an ester bond, widely exists in animals, plants and microorganisms, is a class of hydrolase widely used in organic synthesis, and is also the most widely researched enzyme in genetic engineering. It is divided into eight groups which are classified according to the types of substrates: carboxylate, thioester, phosphate monoester, phosphate diester, phospholipid sulfate, and sulfate. The esterases from different sources have the different catalytic characteristics and catalytic activities.

In a patent (CN105802935B), a marine pseudomonas strain is screened from deep-sea samples, an esterase gene PHE14 is obtained, and an expression vector is constructed and transformed into an expression strain. A recombinant expression esterase PHE14 is obtained, and it may be used to prepare chiral methyl lactate; and in a patent (CN104988165B), an esterase gene est4 is extracted from deep-sea sludge, and a genetically engineered strain containing the esterase gene est4 is constructed to achieve the heterologous expression of the gene est4, and is successfully used in reactions such as the catalytic synthesis of a variety of short-chain terpene esters and the kinetic resolution of a variety of aromatic secondary alcohols.

Although wild-type biocatalysts usually have the better reactivity and selectivity for their natural substrates, their reactivity, stability and selectivity for non-natural substrates are often unsatisfactory. While the biocatalysts are used in organic synthesis, they are non-natural substrates in most cases. In general, wild enzymes may be modified by means of directed evolution, as to improve their reactivity, stability and selectivity (including chemical selectivity, regional selectivity and stereoselectivity) to the non-natural substrates, and thereby it may be used in production.

SUMMARY

The present disclosure aims to provide an esterase mutant and use thereof, as to improve the specificity of the enzyme.

In order to achieve the above purpose, according to one aspect of the present disclosure, an esterase mutant is provided. The esterase mutant an amino acid sequence obtained by the mutation of the amino acid sequence shown in SEQ ID NO: 1, and the mutation comprises a mutation site N51G.

Further, the mutation includes at least one of the following mutation sites: N51G, M52F/L/N/Y/G/W, W115P, T117L/M/F/W/A/I, S140A/G/N/C/T/V/L/P, A142V/L/P/S, V167M, I195L/F/T/V, W196I/L/V, D217M/Q/A/S/G, L231T/I, V267E/C/I/V and S295T/A/Y/F/M/N, herein "/" means "or".

Further, the mutation comprises any one of the following mutation site combinations: N51G+T117M+S140G, N51G+T117M+S140N, N51G+T117M+S140C, N51G+T117M+S140T, N51G+T117M+S140A, N51G+T117M+A142V, N51G+T117M+A142P, N51G+T117M+A142S, N51G+T117M+A142L, N51G+T117M+D217Q, N51G+T117M+D217A, N51G+T117M+D217S, N51G+T117M+D217G, N51G+T117M+L231I, N51G+T117M+S140C+M52F, N51G+T117M+S140C+M52L, N51G+T117M+S140C+M52N. N51G+T117M+S140C-FM52Y, N51G+T117M+S140C+M52G, N51G+T117M+S140C+M52W, N51G+T117M+S140C+I195F, N51G+T117M+S140C+I195L, N51G+T117M+S140C+I195T, N51G+T117M+S140C+I195V, N51G+T117M+S140C+D217S, N51G+T117M+S140C+L231I, N51G+T117M+S140C+V267I, N51G+T117M+S140C+I268V, N51G+T117M+S140C+S295F, N51G+T117M+S140C+S295M, N51G+T117M+S140C+S295N, N51G+T117M+S140C+S295G, N51G+T117M+S140C+S295D.

According to another aspect of the present disclosure, a DNA molecule is provided. The DNA molecule encodes the above esterase mutant.

According to another aspect of the present disclosure, a recombinant plasmid is provided. The recombinant plasmid contains any one of the above DNA molecules.

Further, the recombinant plasmid is pET-22a(+), pET-22b(+), pET-3a(+), pET-3d(+), pET-11a(+), pET-12a(+), pET-14b, pET-15b(+), pET-16b(+), pET-17b(+), PET-19b(+), pET-20b(+), pET-21a(+), pET-23a(+), pET-23b(+), pET-24a(+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a(+), pET-41b(+), pET-42a(+), pET-43a(+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-8, pUC-18 or pUC-19.

According to another aspect of the present disclosure, a host cell is provided. The host cell contains any one of the above recombinant plasmids.

Further, the host cell includes a prokaryotic cell or a eukaryotic cell; and preferably, the prokaryotic cell is *Escherichia coli* BL21 cell or *Escherichia coli* DH5α competent cell, and the eukaryotic cell is yeast.

According to another aspect of the present disclosure, a method for producing a chiral acid is provided. The method includes a step of catalyzing a reaction of an ester compound by an esterase, and the esterase is any one of the above esterase mutants.

Further, the ester compound is

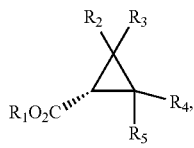

and a reaction product is

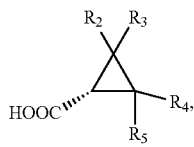

herein $R_1$ represents —$CH_3$, —$CH_2CH_3$, —$CH_2CH_2CH_3$ or —$CHCH_3CH_3$; $R_2$, $R_3$, $R_4$ and $R_5$ each independently represent —H, —F, —Cl, —Br, —$CH_3$ or —$CH_2CH_3$; and preferably, the ester compound is

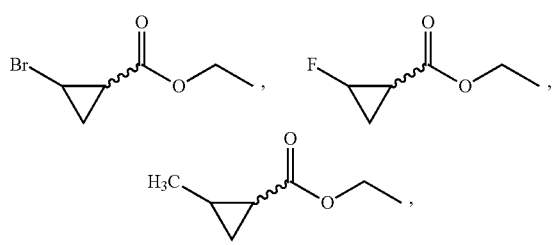

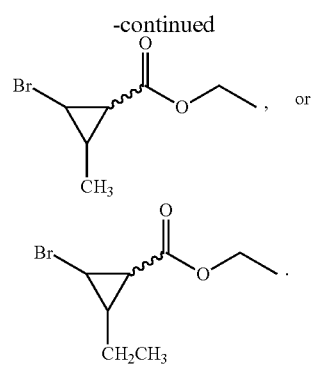

Further, a pH of the reaction catalyzed by an esterase mutant is 8.5 to 9.0, and a reaction temperature is 30° C. to 35° C.

The esterase mutant of the present disclosure is based on the esterase shown in SEQ ID NO: 1, and is mutated by a method of site-directed mutation, as to change its amino acid sequence and achieve changes of the protein structure and function, and then the esterase with the above mutation site is obtained by a method of directional screening. Therefore, these esterase mutants have the advantage of greatly improving enzyme specificity, and the enzyme activity is also correspondingly improved, thus the usage amount of the enzyme is greatly reduced, and the cost in industrial production is reduced.

DETAILED DESCRIPTION OF THE EMBODIMENTS

It should be noted that embodiments in the present application and features in the embodiments may be combined with each other without conflicting. The present disclosure is described in detail below in combination with the embodiments.

The present disclosure improves the specificity of esterase and reduces the usage amount of esterase by a method of directed evolution. The template amino acid sequence of the present disclosure (derived from *Bacillus* sp.01-855, National Center of Biotechnology Information (NCBI) Serial Number: AY640622 is SEQ ID NO: 1 (MG-SNNDNMGKRGGNLMITIPTVHKVSLPNGEVMG-YRKRDGGEKTILLVHGNMTSSK HWDLFFETFPA-SYTLVAIDMRGFGESSYNKRVEGIEDFAQDLKFFV-DQLGLNDFTMIG WSTGGAVCMQFEAQYPGYCD-KIVLISSASTRGYPFFGTHSDGTPDLNQRLKTVDDIEK DPMRTIPIQQAYDTGNRALLKTIWNSLIYTHNQPEE-KRYEAYVDDMMTQRNLADVYHA LNTFNISSVTN-GLTEGTNQANLIRIPVLVLRGERDLVISKEMTEEIV-EDLGTNSTYKELSA SGHSPFIDDCDQLTNIITDFLEK), and the corresponding nucleotide sequence is SEQ IDNO: 2 (ATGGGCAGCAATAACGACAACATGGGTAAAC-GTGGCGGCAACCTGATGAT CACCATCCCGAC-AGTGCATAAAGTGAGCCTGCCGAATGGCGAAGT-GATGGGTTAT CGTAAGCGCGACGGCGGTGAAAA-AACCATCCTGCTGGTGCACGGCAACATGACCA GCAGCAAACATTGGGACCTGTTCTTCGAGACCTT-TCCGGCAAGCTATACACTGGTG GCCATCGATATG-CGCGGCTTCGGCGAAAGCAGCTATAACAAACGC-GTGGAAGGCA TCGAGGACTTTGCCCAGGACCT-GAAATTCTTCGTGGATCAGCTGGGCCTGAACGA TTTCACCATGATCGGTTGGAGCACAGGCGGCGCC-GTGTGTATGCAGTTTGAAGCC CAGTATCCGGGC-TACTGCGACAAGATTGTGCTGATTAGCAGCGCA- AGCACCCGTG GCTATCCGTTTTTTGGTACC-
CACAGCGATGGCACCCCGGATCTGAATCAGCGCCT
GAAGACCGTGGACGACATCGAAAAAGATCC-
TATGCGCACCATTCCGATCCAGCAG GCCTACGA-
TACCGGTAACCGCGCCCTGCTGAAAACCATCTG-
GAATAGCCTGATTTA CACCCACAACCAGCCGGAG-
GAAAAGCGCTATGAGGCCTATGTGGACGACAT-
GATG ACCCAGCGTAATCTGGCCGATGTGTATCA-
CGCCCTGAACACATTCAACATTAGCAG CGTGAC-
CAACGGCCTGACCGAGGGCACCAATCAGGC-
CAACCTGATCCGCATCCCT GTGCTGGTTCTGCG-
CGGCGAACGCGACCTGGTGATCAGCAAAGAGA-
TGACCGAG GAGATCGTGGAGGATCTGGGCAC-
CAACAGCACCTATAAAGAGCTGAGCGCCAGC GGC-
CACAGCCCTTTTATCGATGATTGCGACCAGCTGAC-
CAACATCATCACCGATTT TCTGGA GAAATAA).

Firstly, a mutation site is introduced into the esterase by a mode of site-directed mutation, and the specificity of the mutant is detected to select the mutant with improved specificity. Compared with an initial template, the specificity of the mutant N51G is increased significantly. Subsequently, the mutant N51G is used as a template to continue the mutation in order to obtain a mutant with improved catalytic activity.

Herein, site-directed mutation: referring to introduction of required changes (usually changes that represent favorable directions) into a target DNA segment (either a genome or a plasmid) by a polymerase chain reaction (PCR) or other methods, including base addition, deletion, point mutation and the like. The site-directed mutation may rapidly and efficiently improve the character and representation of a target protein expressed by DNA, and is a very useful means in gene research work.

A method of introducing the site-directed mutation by the whole-plasmid PCR is simple and effective, and is more widely used at present. The principle thereof is that a pair of primers (forward and reverse) containing mutation sites are annealed with a template plasmid, "cyclic extension" is performed by using a polymerase, and the so-called cyclic extension is that the polymerase extends the primer according to the template, is returned to a 5'-terminal of the primer and terminated after one circle, and subjected to a cycle of repeatedly heated and annealed extension, this reaction is different from rolling circle amplification, and does not form multiple tandem copies. Extension products of the forward and reverse primers are paired to form an open-circle plasmid with an incision after annealed. A Dpn I enzyme-digested extension product, because the original template plasmid is derived from conventional *Escherichia coli*, is modified by dam methylation, and is sensitive to Dpn I so as to be shredded, but a plasmid with a mutant sequence synthesized in vitro is not cut because it is not methylated, so it may be successfully transformed in subsequent transformation, and a clone of a mutant plasmid may be obtained. The mutant plasmid is transformed into *Escherichia coli* cells, and then a crude enzyme is obtained by ultrasonic cell-break.

The mutant plasmid described above is transformed into the *Escherichia coli* cells and overexpressed in the *Escherichia coli*. Then the crude enzyme is obtained by the method of ultrasonic cell-break. The optimum condition for induced expression of the esterase is: 25° C., and inducing in 0.1 mM isopropyl-β-d-thiogalactoside (IPTG) for 16 h.

By computer simulation analysis of the three-dimensional structure of the esterase by using software, it is found that the mutation sites are located near the substrate binding site, and the mutation may enhance the binding of substrate and enzyme, thus the catalytic efficiency is improved.

According to a typical implementation of the present disclosure, an esterase mutant is provided. The esterase mutant has an amino acid sequence obtained by the mutation of the amino acid sequence shown in SEQ ID NO: 1, and the mutation comprises a mutation site N51G.

Preferably, the mutation includes at least one of the following mutation sites: N51G, M52F/L/N/Y/G/W, W115P, T117L/M/F/W/A/I, S140A/G/N/C/T/V/L/P, A142V/L/P/S, V167M, I195L/F/T/V, W196I/L/V, D217M/Q/A/S/G, L231T/I, V267E/C/I/V and S295T/A/Y/F/M/N, herein "/" means "or".

More preferably, the mutation comprises any one of the following mutation site combinations: N51G+T117M+S140G, N51G+T117M+S140N, N51G+T117M+S140C, N51G+T117M+S140T, N51G+T117M+S140A, N51G+T117M+A142V, N51G+T117M+A142P, N51G+T117M+A142S, N51G+T117M+A142L, N51G+T117M+D217Q, N51G+T117M+D217A, N51G+T117M+D217S, N51G+T117M+D217G, N51G+T117M+L231I, N51G+T117M+S140C+M52F, N51G+T117M+S140C+M52L, N51G+T117M+S140C+M52N, N51G+T117M+S140C-FM52Y, N51G+T117M+S140C+M52G, N51G+T117M+S140C+M52W, N51G+T117M+S140C+I195F, N51G+T117M+S140C+I195L, N51G+T117M+S140C+I195T, N51G+T117M+S140C+I195V, N51G+T117M+S140C+D217S, N51G+T117M+S140C+L231I, N51G+T117M+S140C+V267I, N51G+T117M+S140C+I268V, N51G+T117M+S140C+S295F, N51G+T117M+S140C+S295M, N51G+T117M+S140C+S295N, N51G+T117M+S140C+S295G, N51G+T117M+S140C+S295D.

The esterase mutant of the present disclosure is based on the esterase shown in SEQ ID NO: 1, and is mutated by a method of site-directed mutation, as to change its amino acid sequence and achieve changes of the protein structure and function, and then the esterase with the above mutation site is obtained by a method of directional screening. Therefore, these esterase mutants have the advantage of greatly improving enzyme specificity, and the enzyme activity is also correspondingly improved, thus the usage amount of the enzyme is greatly reduced, and the cost in industrial production is reduced.

According to a typical implementation of the present disclosure, a DNA molecule is provided. The esterase encoded by the above DNA may improve the enzyme activity and stability, the usage amount of the enzyme in the industrial production of amino acids may be reduced, and the difficulty of post-treatment is reduced.

The above DNA molecule of the disclosure may also exist in the form of an "expression cassette". The "expression cassette" refers to a linear or circular nucleic acid molecule that encompasses DNA and RNA sequences capable of guiding expression of a specific nucleotide sequence in an appropriate host cell. Generally, including a promoter which is effectively linked with a target nucleotide, it is optionally effectively linked with a termination signal and/or other control elements. The expression cassette may also include a sequence required for proper translation of the nucleotide sequence. A coding region usually encodes a target protein, but also encodes a target function RNA in a sense or antisense direction, for example an antisense RNA or an untranslated RNA. The expression cassette including a target polynucleotide sequence may be chimeric, which means that at least one of components thereof is heterologous to at least one of the other components thereof. The expression cassette may also be existent naturally, but obtained with effective recombinant formation for heterologous expression.

According to a typical embodiment of the present disclosure, a recombinant plasmid is provided. The recombinant plasmid contains any one of the above DNA molecules. The DNA molecule in the above recombinant plasmid is placed in an appropriate position of the recombinant plasmid, so that the above DNA molecule may be correctly and smoothly replicated, transcribed or expressed.

Although a qualifier used in the disclosure while the above DNA molecule is defined is "contain", it does not mean that other sequences which are not related to a function thereof may be arbitrarily added to both ends of the DNA sequence. Those skilled in the art know that in order to meet the requirements of recombination operations, it is necessary to add suitable enzyme digestion sites of a restriction enzyme at two ends of the DNA sequence, or additionally increase a start codon, a termination codon and the like, therefore, if the closed expression is used for defining, these situations may not be covered truly.

A term "plasmid" used in the present disclosure includes any plasmid, cosmid, bacteriophage or agrobacterium binary nucleic acid molecule in double-stranded or single-stranded linear or circular form, preferably a recombinant expression plasmid, which may be a prokaryotic expression plasmid or may be a eukaryotic expression plasmid, preferably the prokaryotic expression plasmid, in some embodiments, the recombinant plasmid is selected from pET-22a (+), pET-22b (+), pET-3a (+), pET-3d (+), pET-11a (+), pET-12a (+), pET-14b (+), pET-15b (+), pET-16b (+), pET-17b (+), PET-19b (+), pET-20b (+), pET-21a (+), pET-23a (+), pET-23b (+), pET-24a (+), pET-25b (+), pET-26b (+), pET-27b (+), pET-28a (+), pET-29a (+), pET-30a (+), pET-31b (+), pET-32a (+), pET-35b (+), pET-38b (+), pET-39b (+), pET-40b (+), pET-41a (+), pET-41b (+), pET-42a (+), pET-43a (+), pET-43b (+), pET-44a (+), pET-49b (+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-8, pUC-18 or pUC-19. More preferably, the above recombinant plasmid is pET-22b (+).

According to a typical implementation of the present disclosure, a host cell is provided. The host cell contains any one of the above recombinant plasmids. The host cell applicable to the present disclosure includes but is not limited to a prokaryotic cell or a eukaryotic cell. Preferably the prokaryotic cell is *Escherichia coli* BL21 cell or *Escherichia coli* DH5α competent cell, and the eukaryotic cell is yeast.

According to a typical implementation of the present disclosure, a method for producing a chiral acid is provided. The method includes a step of catalyzing a reaction of an ester compound by an esterase, and the esterase is any one of the above esterase mutants. Because the above esterase of the present disclosure has the better specificity and even higher enzyme catalytic activity, the preparation of the chiral acid using the esterase mutant of the present disclosure may not only reduce the production cost, but also obtain a higher enantiomeric excess (ee) value of the amino acid.

According to a typical implementation of the present disclosure, the ester compound is

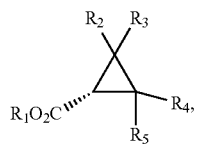

and a reaction product is

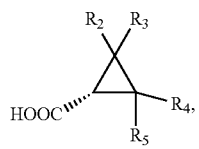

herein $R_1$ represents —$CH_3$, —$CH_2CH_3$, —$CH_2CH_2CH_3$ or —$CHCH_3CH_3$; $R_2$, $R_3$, $R_4$ and $R_5$ each independently represent —H, —F, —Cl, —Br, —$CH_3$ or —$CH_2CH_3$; and preferably, the ester compound is

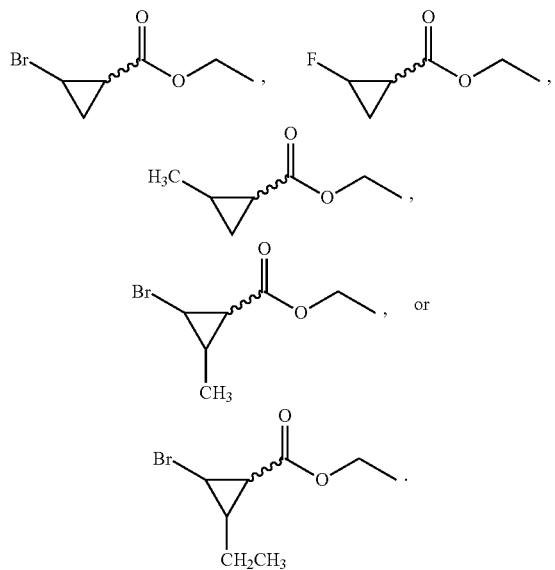

Preferably, a pH of the reaction catalyzed by an esterase mutant is 8.5 to 9.0, and a reaction temperature is 30° C. to 35° C.

The beneficial effects of the present disclosure are further described below in combination with specific embodiments.

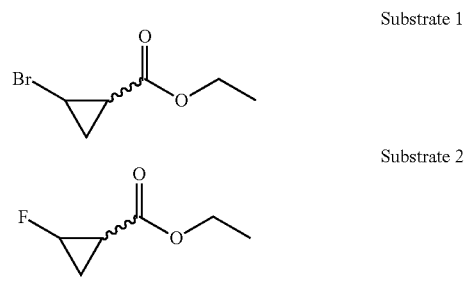

Substrate 1

Substrate 2

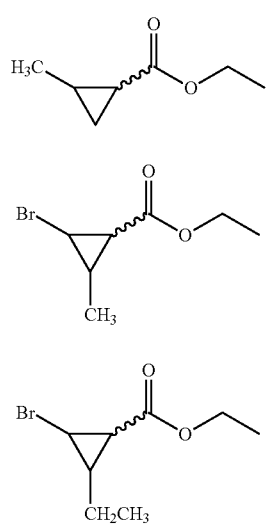

Embodiment 1

20 mg of Substrate 1 added, 1 mL reaction system, 2 mg of esterase, and 0.3 M of potassium phosphate buffer pH 7.5. After it was reacted at 30° C. for 16 h, 50 μL of 6 M HCl was added into the 1 mL reaction system, and pH was between 2~3. After being mixed uniformly, 2 mL of ethyl acetate was added. After being shaken fully, it was centrifuged at 12000 rpm for 3 min, a supernatant was taken and appropriate amount of anhydrous magnesium sulfate was added, it was centrifuged at 12000 rpm for 3 min, a supernatant was taken for gas phase detection, the transformation rate and e.e. value were detected. Substrate 2 and Substrate 3, as described in Substrate 1, established reaction and treatment modes of the same system. Results were shown in Table 1.

TABLE 1

| Enzyme | Substrate 1 | | Substrate 2 | | Substrate 3 | |
|---|---|---|---|---|---|---|
| | Activity | e.e. (%) | Activity | e.e. (%) | Activity | e.e. (%) |
| WT | | −14.0 | | −30 | | −25 |
| N51G | − | *** | − | ** | + | *** |
| N51G + W115P | − | ** | − | ** | + | ** |
| N51G + T117L | + | *** | + | *** | + | ** |
| N51G + T117M | ++ | **** | ++ | **** | ++ | **** |
| N51G + T117F | − | *** | −− | *** | −− | * |
| N51G + T117W | − | *** | − | ** | − | *** |
| N51G + T117A | ++ | *** | + | * | + | *** |
| N51G + T117I | + | *** | − | *** | − | ** |
| N51G + A142V | +++ | *** | + | ** | − | *** |
| N51G + V167M | + | * | − | * | − | ** |
| N51G + W196I | − | ** | + | * | + | ** |
| N51G + W196L | + | *** | − | *** | − | ** |
| N51G + W196V | − | ** | + | ** | ++ | ** |
| N51G + D217M | + | ** | + | ** | + | ** |
| N51G + L231T | ++ | *** | − | ** | − | *** |
| N51G + L231I | + | *** | − | *** | − | ** |
| N51G + V267E | − | ** | + | ** | + | ** |
| N51G + V267C | ++ | ** | + | * | ++ | ** |
| N51G + S295T | + | ** | + | ** | + | ** |
| N51G + S295A | + | *** | ++ | *** | ++ | ** |

TABLE 1-continued

| Enzyme | Substrate 1 | | Substrate 2 | | Substrate 3 | |
|---|---|---|---|---|---|---|
| | Activity | e.e. (%) | Activity | e.e. (%) | Activity | e.e. (%) |
| N51G + S295Y | + | ** | + | ** | + | *** |
| N51G + S295F | + | ** | + | *** | + | ** |

Compared with a female parent, the times of decrease and increase in activity are as follows:

−−− represents decrease by 10-50 times,

−− represents decrease by 5-10 times,

− represents decrease by 1-5 times,

+ represents increase by 1-5 times,

++ represents increase by 5-10 times,

+++ represents increase by 10-50 times, and

++++ represents increase by more than 50 times.

* represents the ee value less than 0%,

** represents the ee value of 0-50%,

*** represents the ee value of 50-95%, and

**** represents the ee value greater than 95%.

Embodiment 2

20 mg of Substrate 4 added, 1 mL reaction system, 2 mg of esterase, and 0.3 M of potassium phosphate buffer pH 7.5. After it was reacted at 30° C. for 16 h, 50 μL of 6 M HCl was added into the 1 mL reaction system, and pH was between 2~3. After being mixed uniformly, 2 mL of ethyl acetate was added. After being shaken fully, it was centrifuged at 12000 rpm for 3 min, a supernatant was taken and appropriate amount of anhydrous magnesium sulfate was added, it was centrifuged at 12000 rpm for 3 min, a supernatant was taken for gas phase detection, the transformation rate and e.e. value were detected. Substrate 5, as described in Substrate 4, established reaction and treatment modes of the same system. Results were shown in Table 2.

TABLE 2

| Enzyme | Substrate 4 | | Substrate 5 | |
|---|---|---|---|---|
| | Activity | e.e.(%) | Activity | e.e.(%) |
| WT | | −20.0 | | −10 |
| N51G | − | *** | − | ** |
| N51G + W115P | − | * | + | ** |
| N51G + T117L | + | *** | ++ | ** |
| N51G + T117M | ++ | **** | + | **** |
| N51G + T117F | − | *** | − | *** |
| N51G + T117W | − | *** | − | ** |
| N51G + T117A | ++ | ** | + | *** |
| N51G + T117I | + | *** | + | *** |
| N51G + A142V | +++ | *** | ++ | ** |
| N51G + V167M | + | ** | + | ** |
| N51G + W196I | − | ** | − | *** |
| N51G + W196L | + | *** | + | ** |
| N51G + W196V | − | ** | − | ** |
| N51G + D217M | + | ** | ++ | *** |
| N51G + L231T | ++ | *** | + | ** |
| N51G + L231I | + | *** | + | ** |
| N51G + V267E | − | ** | − | *** |
| N51G + V267C | ++ | ** | + | ** |
| N51G + S295T | + | ** | ++ | *** |
| N51G + S295A | + | *** | + | ** |

TABLE 2-continued

|  | Substrate 4 | | Substrate 5 | |
| --- | --- | --- | --- | --- |
| Enzyme | Activity | e.e.(%) | Activity | e.e.(%) |
| N51G + S295Y | + | ** | ++ | ** |
| N51G + S295F | + | ** | + | *** |

Compared with a female parent, the times of decrease and increase in activity are as follows:
— — — represents decrease by 10-50 times,
— — represents decrease by 5-10 times,
— represents decrease by 1-5 times,
+ represents increase by 1-5 times,
++ represents increase by 5-10 times,
+++ represents increase by 10-50 times, and
++++ represents increase by more than 50 times.
\* represents the ee value less than 0%,
\*\* represents the ee value of 0-50%,
\*\*\* represents the ee value of 50-95%, and
\*\*\*\* represents the ee value greater than 95%.

The mutation is continued, the ee value of a product is increased, the substrate concentration is increased, and the reaction volume is reduced.

Embodiment 3

33 mg of Substrate 1 added, 1 mL reaction system, 3.3 mg of esterase, 50 μL of N,N-dimethylformamide, and 0.3 M of Tris-HCl pH 8.5 buffer. After it was reacted at 30° C. for 16 h, 50 μL of 6 M HCl was added into the 1 mL reaction system, and pH was between 2~3. After being mixed uniformly, 2 mL of ethyl acetate was added. After being shaken fully, it was centrifuged at 12000 rpm for 3 min, a supernatant was taken and appropriate amount of anhydrous magnesium sulfate was added, it was centrifuged at 12000 rpm for 3 min, a supernatant was taken for gas phase detection, the transformation rate and e.e. value were detected. Substrate 2 and Substrate 3, as described in Substrate 1, established reaction and treatment modes of the same system. Results were shown in Table 3.

TABLE 3

|  | Substrate 1 | | Substrate 2 | | Substrate 3 | |
| --- | --- | --- | --- | --- | --- | --- |
| Enzyme | Activity | e.e.(%) | Activity | e.e.(%) | Activity | e.e.(%) |
| N51G + T117M + S140G | ++ | *** | +++ | *** | ++ | **** |
| N51G + T117M + S140N | ++ | *** | +++ | **** | ++ | **** |
| N51G + T117M + S140C | +++ | **** | ++ | **** | ++ | **** |
| N51G + T117M + S140T | + | *** | + | **** | ++ | **** |
| N51G + T117M + S140A | ++ | *** | ++ | *** | + | *** |
| N51G + T117M + A142V | + | **** | ++ | **** | + | **** |
| N51G + T117M + A142P | + | **** | + | **** | ++ | **** |
| N51G + T117M + A142S | + | **** | + | *** | + | *** |
| N51G + T117M + A142L | + | *** | ++ | *** | + | *** |
| N51G + T117M + D217Q | + | **** | + | **** | ++ | **** |
| N51G + T117M + D217A | ++ | *** | ++ | **** | ++ | **** |
| N51G + T117M + D217S | ++ | **** | + | **** | ++ | *** |
| N51G + T117M + D217G | − | *** | − | *** | + | *** |
| N51G + T117M + L231I | + | *** | ++ | *** | + | *** |

Compared with a female parent, the times of decrease and increase in activity are as follows:
— — — represents decrease by 10-50 times,
— — represents decrease by 5-10 times,
— represents decrease by 1-5 times,
+ represents increase by 1-5 times,
++ represents increase by 5-10 times,
+++ represents increase by 10-50 times, and
++++ represents increase by more than 50 times.
\* represents the ee value less than 0%,
\*\* represents the ee value of 0-50%,
\*\*\* represents the ee value of 50-95%, and
\*\*\*\* represents the ee value greater than 95%.

Embodiment 4

33 mg of Substrate 4 added, 1 mL reaction system, 3.3 mg of esterase, 50 μL of N,N-dimethylformamide, and 0.3 M of Tris-HCl pH 8.5 buffer. After it was reacted at 30° C. for 16 h, 50 μL of 6 M HCl was added into the 1 mL reaction system, and pH was between 2~3. After being mixed uniformly, 2 mL of ethyl acetate was added. After being shaken fully, it was centrifuged at 12000 rpm for 3 min, a supernatant was taken and appropriate amount of anhydrous magnesium sulfate was added, it was centrifuged at 12000 rpm for 3 min, a supernatant was taken for gas phase detection, the transformation rate and e.e. value were detected. Substrate 5, as described in Substrate 4, established reaction and treatment modes of the same system. Results were shown in Table 4.

TABLE 4

|  | Substrate 4 | | Substrate 5 | |
| --- | --- | --- | --- | --- |
| Enzyme | Activity | e.e.(%) | Activity | e.e.(%) |
| N51G + T117M + S140G | ++ | *** | +++ | *** |
| N51G + T117M + S140N | + | **** | ++ | *** |
| N51G + T117M + S140C | +++ | **** | ++ | **** |
| N51G + T117M + S140T | + | **** | + | *** |
| N51G + T117M + S140A | +++ | **** | ++ | *** |
| N51G + T117M + A142V | + | **** | + | **** |
| N51G + T117M + A142P | + | **** | ++ | **** |
| N51G + T117M + A142S | + | *** | + | **** |
| N51G + T117M + A142L | ++ | *** | + | *** |
| N51G + T117M + D217Q | ++ | **** | ++ | **** |
| N51G + T117M + D217A | ++ | **** | + | **** |
| N51G + T117M + D217S | ++ | **** | ++ | *** |

TABLE 4-continued

|  | Substrate 4 | | Substrate 5 | |
| --- | --- | --- | --- | --- |
| Enzyme | Activity | e.e.(%) | Activity | e.e.(%) |
| N51G + T117M + D217G | + | *** | − | *** |
| N51G + T117M + L231I | + | *** | + | *** |

Compared with a female parent, the times of decrease and increase in activity are as follows:
--- represents decrease by 10-50 times,
-- represents decrease by 5-10 times,
- represents decrease by 1-5 times,
+ represents increase by 1-5 times,
++ represents increase by 5-10 times,
+++ represents increase by 10-50 times, and
++++ represents increase by more than 50 times.
* represents the ee value less than 0%,
** represents the ee value of 0-50%,
*** represents the ee value of 50-95%, and
**** represents the ee value greater than 95%.

The beneficial mutation sites are further combined to further increase the substrate concentration and reduce the reaction volume.

Embodiment 5

50 mg of Substrate 1 added, 1 mL reaction system, 5 mg of esterase, 50 μL of N,N-dimethylformamide, and 0.3 M of Tris-HCl pH 8.5 buffer. After it was reacted at 30° C. for 16 h, 50 μL of 6 M HCl was added into the 1 mL reaction system, and pH was between 2~3. After being mixed uniformly, 2 mL of ethyl acetate was added. After being shaken fully, it was centrifuged at 12000 rpm for 3 min, a supernatant was taken and appropriate amount of anhydrous magnesium sulfate was added, it was centrifuged at 12000 rpm for 3 min, a supernatant was taken for gas phase detection, the transformation rate and e.e. value were detected. Substrate 2 and Substrate 3, as described in Substrate 1, established reaction and treatment modes of the same system. Results were shown in Table 5.

TABLE 5

|  | Substrate 1 | | Substrate 2 | | Substrate 3 | |
| --- | --- | --- | --- | --- | --- | --- |
| Enzyme | Activity | e.e. (%) | Activity | e.e. (%) | Activity | e.e. (%) |
| N51G + T117M + S140C + M52F | ++ | *** | ++ | *** | ++ | *** |
| N51G + T117M + S140C + M52L | +++ | *** | +++ | **** | ++ | *** |
| N51G + T117M + S140C + M52N | ++ | **** | + | **** | + | *** |
| N51G + T117M + S140C + M52Y | + | **** | + | **** | ++ | **** |
| N51G + T117M + S140C + M52G | + | **** | ++ | **** | + | **** |
| N51G + T117M + S140C + M52W | +++ | **** | ++ | *** | ++ | **** |
| N51G + T117M + S140C + I195F | ++ | **** | ++ | **** | ++ | **** |
| N51G + T117M + S140C + I195L | +++ | **** | ++ | **** | +++ | **** |
| N51G + T117M + S140C + I195T | + | **** | + | **** | + | **** |
| N51G + T117M + S140C + I195V | ++ | *** | ++ | **** | ++ | **** |
| N51G + T117M + S140C + D217S | +++ | **** | ++ | **** | ++ | **** |
| N51G + T117M + S140C + L231I | + | **** | + | **** | + | *** |
| N51G + T117M + S140C + V267I | + | **** | + | **** | ++ | **** |
| N51G + T117M + S140C + I268V | + | *** | ++ | *** | + | *** |
| N51G + T117M + S140C + S295F | +++ | **** | +++ | **** | +++ | **** |
| N51G + T117M + S140C + S295M | ++ | *** | ++ | **** | ++ | **** |
| N51G + T117M + S140C + S295N | +++ | **** | ++ | **** | +++ | **** |
| N51G + T117M + S140C + S295G | +++ | **** | ++ | **** | ++ | *** |
| N51G + T117M + S140C + S295D | ++ | **** | ++ | **** | +++ | **** |

Compared with a female parent, the times of decrease and increase in activity are as follows:

--- represents decrease by 10-50 times,

-- represents decrease by 5-10 times,

- represents decrease by 1-5 times,

+ represents increase by 1-5 times,

++ represents increase by 5-10 times,

+++ represents increase by 10-50 times, and

++++ represents increase by more than 50 times.

* represents the ee value less than 0%,

** represents the ee value of 0-50%,

*** represents the ee value of 50-95%, and

**** represents the ee value greater than 95%.

Embodiment 6

50 mg of Substrate 4 added, 1 mL reaction system, 5 mg of esterase, 50 μL. of N,N-dimethylformamide, and 0.3 M of Tris-HCl pH 8.5 buffer. After it was reacted at 30° C. for 16 h, 50 μL of 6 M HCl was added into the 1 mL reaction system, and pH was between 2~3. After being mixed uniformly, 2 mL of ethyl acetate was added. After being shaken fully, it was centrifuged at 12000 rpm for 3 min, a supernatant was taken and appropriate amount of anhydrous magnesium sulfate was added, it was centrifuged at 12000 rpm for 3 min, a supernatant was taken for gas phase detection, the transformation rate and e.e. value were detected. Substrate 5, as described in Substrate 4, established reaction and treatment modes of the same system. Results were shown in Table 6.

TABLE 6

| | Substrate 4 | | Substrate 5 | |
|---|---|---|---|---|
| Enzyme | Activity | e.e. (%) | Activity | e.e. (%) |
| N51G + T117M + S140C + M52F | ++ | *** | ++ | *** |
| N51G + T117M + S140C + M52L | ++ | *** | + | *** |
| N51G + T117M + S140C + M52N | ++ | **** | + | **** |
| N51G + T117M + S140C + M52Y | + | *** | + | **** |
| N51G + T117M + S140C + M52G | ++ | **** | ++ | **** |
| N51G + T117M + S140C + M52W | ++ | **** | +++ | *** |
| N51G + T117M + S140C + I195F | ++ | **** | ++ | **** |
| N51G + T117M + S140C + I195L | +++ | **** | ++ | **** |
| N51G + T117M + S140C + I195T | + | **** | + | **** |
| N51G + T117M + S140C + I195V | +++ | **** | +++ | *** |
| N51G + T117M + S140C + D217S | ++ | **** | ++ | **** |
| N51G + T117M + S140C + L231I | ++ | *** | + | **** |
| N51G + T117M + S140C + V267I | + | **** | + | **** |
| N51G + T117M + S140C + I268V | + | *** | ++ | *** |
| N51G + T117M + S140C + S295F | ++ | **** | +++ | **** |
| N51G + T117M + S140C + S295M | ++ | **** | +++ | *** |
| N51G + T117M + S140C + S295N | +++ | **** | +++ | **** |
| N51G + T117M + S140C + S295G | ++ | *** | ++ | **** |
| N51G + T117M + S140C + S295D | ++ | **** | +++ | *** |

Compared with a female parent, the times of decrease and increase in activity are as follows:
--- represents decrease by 10-50 times,
-- represents decrease by 5-10 times,
- represents decrease by 1-5 times,
+ represents increase by 1-5 times,
++ represents increase by 5-10 times,
+++ represents increase by 10-50 times, and
++++ represents increase by more than 50 times.
* represents the ee value less than 0%,
** represents the ee value of 0-50%,
*** represents the ee value of 50-95%, and
**** represents the ee value greater than 95%.

Embodiment 7

Based on the reaction conditions, a reaction system was optimized.

50 mg of Substrate 1 added, 1 mL reaction system, 5 mg of esterase (N51G+T117M+S140C+S295N), 50 μL of N,N-dimethylformamide, and 0.3 M of Tris-HCl pH 8.5 buffer. Based on the reaction conditions, the reaction system was optimized, with cosolvent dimethylsulfoxide (DMSO) (0%~20%) and dimethyl formamide (DMF) (0%~20%) with different solubility, buffer (0.1 M~1 M Tris-HCl pH 8.5) with different concentrations, buffer (0.3 M potassium phosphate buffer (KPB) pH 7~8, 0.3 M Tris-HCl pH 8~9) with different pH, and the reaction temperature (20° C.~50° C.). After it was reacted for 16 h, 50 μL of 6 M HCl was added into the 1 mL reaction system, and pH was between 2~3. After being mixed uniformly, 2 mL of ethyl acetate was added. After being shaken fully, it was centrifuged at 12000 rpm for 3 min, a supernatant was taken and appropriate amount of anhydrous magnesium sulfate was added, it was centrifuged at 12000 rpm for 3 min, a supernatant was taken for gas phase detection, the transformation rate and e.e. value were detected. Results were shown in Tables 7-10.

TABLE 7

| | | Substrate 1 | |
|---|---|---|---|
| Enzyme | Cosolvent | Activity | e.e. (%) |
| N51G + T117M + S140C + S295N | DMSO 0% | ++ | **** |
| N51G + T117M + S140C + S295N | DMSO 5% | +++ | **** |
| N51G + T117M + S140C + S295N | DMSO 10% | +++ | **** |
| N51G + T117M + S140C + S295N | DMSO 15% | +++ | **** |
| N51G + T117M + S140C + S295N | DMSO 20% | ++ | **** |
| N51G + T117M + S140C + S295N | DMF 0% | ++ | **** |
| N51G + T117M + S140C + S295N | DMF 5% | +++ | **** |
| N51G + T117M + S140C + S295N | DMF 10% | ++ | **** |
| N51G + T117M + S140C + S295N | DMF 15% | ++ | **** |
| N51G + T117M + S140C + S295N | DMF 20% | + | **** |

TABLE 8

| | | Substrate 1 | |
|---|---|---|---|
| Enzyme | Buffer | Activity | e.e. (%) |
| N51G + T117M + S140C + S295N | 0.1M Tris-HCl pH 8.5 | ++ | **** |
| N51G + T117M + S140C + S295N | 0.3M Tris-HCl pH 8.5 | +++ | **** |
| N51G + T117M + S140C + S295N | 0.5M Tris-HCl pH 8.5 | +++ | **** |
| N51G + T117M + S140C + S295N | 0.7M Tris-HCl pH 8.5 | ++ | **** |
| N51G + T117M + S140C + S295N | 1M Tris-HCl pH 8.5 | ++ | **** |

TABLE 9

| | | Substrate 1 | |
|---|---|---|---|
| Enzyme | Buffer | Activity | e.e. (%) |
| N51G + T117M + S140C + S295N | 0.3M KPB pH 7.0 | ++ | **** |
| N51G + T117M + S140C + S295N | 0.3M KPB pH 7.5 | ++ | **** |
| N51G + T117M + S140C + S295N | 0.3M KPB pH 8.0 | ++ | **** |
| N51G + T117M + S140C + S295N | 0.3M Tris-HCl pH 8.0 | ++ | **** |
| N51G + T117M + S140C + S295N | 0.3M Tris-HCl pH 8.5 | +++ | **** |
| N51G + T117M + S140C + S295N | 0.3M Tris-HCl pH 9.0 | +++ | **** |

TABLE 10

| | Reaction | Substrate 1 | |
|---|---|---|---|
| Enzyme | temperature | Activity | e.e. (%) |
| N51G + T117M + S140C + S295N | 20° C. | ++ | **** |
| N51G + T117M + S140C + S295N | 25° C. | ++ | **** |
| N51G + T117M + S140C + S295N | 30° C. | +++ | **** |
| N51G + T117M + S140C + S295N | 35° C. | +++ | **** |
| N51G + T117M + S140C + S295N | 40° C. | + | **** |

TABLE 10-continued

| Enzyme | Reaction temperature | Substrate 1 Activity | e.e. (%) |
|---|---|---|---|
| N51G + T117M + S140C + S295N | 45° C. | + | *** |
| N51G + T117M + S140C + S295N | 50° C. | + | *** |

Compared with a female parent, the times of decrease and increase in activity are as follows: --- represents decrease by 10-50 times, -- represents decrease by 5-10 times, - represents decrease by 1-5 times, + represents increase by 1-5 times, ++ represents increase by 5-10 times, +++ represents increase by 10-50 times, and ++++ represents increase by more than 50 times.

\* represents the ee value less than 0%,  represents the ee value of 0-50%, * represents the ee value of 50-95%, and **** represents the ee value greater than 95%.

According to the optimized reaction system, an amplification reaction of 10 g of the substrate is performed.

Embodiment 8

Based on the optimized reaction system, an amplification reaction was performed. 10 g of Substrate 1 added, 100 mL of a reaction system, 250 mg of esterase (N51G+T117M+S140C+S295N), 5 mL of N,N-dimethylformamide, and 0.5 M Tris-HCl pH 9.0 buffer. It was reacted at 30° C., the reaction time was tracked, a sample was taken for detection, and pH was adjusted to about 9.0. While it was reacted for 50 h, the transformation rate was 48%, and the e.e. value was 98%. After post-treatment was performed on a reaction sample, 6 M of HCl was added, and pH was adjusted between 2~3. After being mixed uniformly, 200 mL of ethyl acetate was added, and it was extracted. After being shaken fully, an organic layer was separated, and appropriate amount of anhydrous sodium sulfate was added. It was further filtered, and rotary evaporation treatment was performed on the organic layer, finally 4.4 g of the sample was obtained, the purity was 98%, and the e.e. value was 98%. Nuclear magnetic detection was further performed, and the yield was 45%.

Embodiment 9

Based on the optimized reaction system, an amplification reaction was performed. 10 g of Substrate 4 added, 100 mL of a reaction system, 250 mg of esterase (N51G-FT117M+S140C+S295N), 5 mL of N,N-dimethylformamide, and 0.5 M Tris-HCl pH 9.0 buffer. It was reacted at 30° C., the reaction time was tracked, a sample was taken for detection, and pH was adjusted to about 9.0. While it was reacted for 60 h, the transformation rate was 48%, and the e.e. value was 98%. After post-treatment was performed on a reaction sample, 6 M of HCl was added, and pH was adjusted between 2~3. After being mixed uniformly, 300 mL of ethyl acetate was added, and it was extracted. After being shaken fully, an organic layer was separated, and appropriate amount of anhydrous sodium sulfate was added. It was further filtered, and rotary evaporation treatment was performed on the organic layer, finally 4.3 g of the sample was obtained, the purity was 98%, and the e.e. value was 98%. Nuclear magnetic detection was further performed, and the yield was 44%.

The above are only preferred embodiments of the present disclosure, and are not intended to limit the present disclosure. For those skilled in the art, the present disclosure may have various modifications and changes. Any modifications, equivalent replacements, improvements and the like made within the spirit and principle of the present disclosure shall be included in the scope of protection of the present disclosure.

What is claimed is:

1. An esterase mutant having an amino acid sequence obtained by the mutation of the amino acid sequence shown in SEQ ID NO: 1, and the mutation comprises a mutation site N51G.

2. The esterase mutant according to claim 1, wherein the mutation comprises any one of the following mutation site combinations: N51G+T117M+S140G, N51G+T117M+S140N, N51G+T117M+S140C, N51G+T117M+S140T, N51G+T117M+S140A, N51G+T117M+A142V, N51G+T117M+A142P, N51G+T117M+A142S, N51G+T117M+A142L, N51G+T117M+D217Q, N51G+T117M+D217A, N51G+T117M+D217S, N51G+T117M+D217G, N51G+T117M+L231I, N51G+T117M+S140C+M52F, N51G+T117M+S140C+M52L, N51G+T117M+S140C+M52N, N51G+T117M+S140C+M52Y, N51G+T117M+S140C+M52G, N51G+T117M+S140C+M52W, N51G+T117M+S140C+I195F, N51G+T117M+S140C+I195L, N51G+T117M+S140C+I195T, N51G+T117M+S140C+I195V, N51G+T117M+S140C+D217S, N51G+T117M+S140C+L231I, N51G+T117M+S140C+V267I, N51G+T117M+S140C+I268V, N51G+T117M+S140C+S295F, N51G+T117M+S140C+S295M, N51G+T117M+S140C+S295N, N51G+T117M+S140C+S295G, or N51G+T117M+S140C+S295D.

3. A DNA molecule encoding the esterase mutant according to claim 1.

4. A recombinant plasmid containing the DNA molecule according to claim 3.

5. The recombinant plasmid according to claim 4, wherein the recombinant plasmid is pET-22b(+), pET-22b(+), pET-3a(+), pET-3d(+), pET-11a(+), pET-12a(+), pET-14b, pET-15b(+), pET-16b(+), pET-17b(+), pET-19b(+), pET-20b(+), pET-21a(+), pET-23a(+), pET-23b(+), pET-24a(+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a(+), pET-41b(+), pET-42a(+), pET-43a(+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-8, pUC-18, or pUC-19.

6. A host cell containing the recombinant plasmid according to claim 4.

7. The host cell according to claim 6, wherein the host cell comprises a prokaryotic cell or a eukaryotic cell.

8. The host cell according to claim 7, wherein the prokaryotic cell is *Escherichia coli* BL21 cell or *Escherichia coli* DH5α competent cell, and the eukaryotic cell is yeast.

9. A method for producing chiral acids, comprising a step of catalyzing a reaction of ester compound by an esterase, wherein the esterase is the esterase mutant according to claim 1.

10. The method according to claim 9, wherein the ester compound is

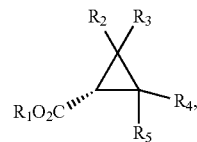

and reaction product is

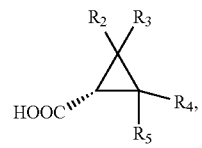

wherein $R_1$ represents —$CH_3$, —$CH_2CH_3$, —$CH_2CH_2CH_3$, or —$CHCH_3CH_3$; $R_2$, $R_3$, $R_4$, and $R_5$ each independently represent —H, —F, —Cl, —Br, —$CH_3$, or —$CH_2CH_3$.

11. The method according to claim 10, wherein the ester compound is

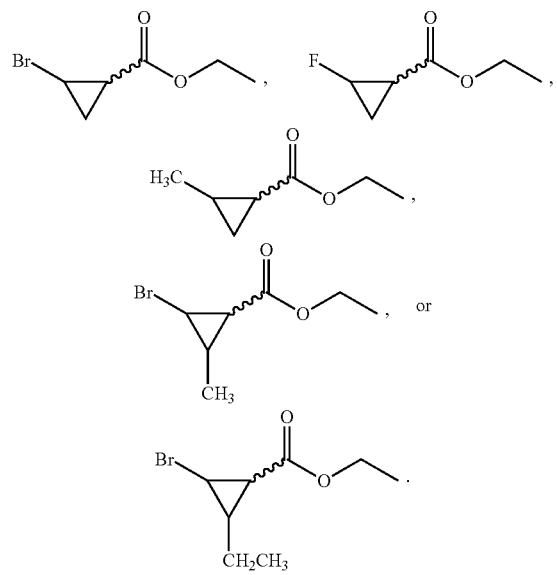

12. The method according to claim 10, wherein a pH of the reaction catalyzed by an esterase mutant is 8.5 to 9.0, and a reaction temperature is 30° C. to 35° C.

* * * * *